Oct. 20, 1925.

I. D. LENGEL 1,558,374

AIR BRAKE MECHANISM

Filed Sept. 8, 1924  3 Sheets-Sheet 1

Inventor-
Irvin D. Lengel.
by his Attorneys.
Howson & Howson

Oct. 20, 1925.

I. D. LENGEL

AIR BRAKE MECHANISM

Filed Sept. 8, 1924    3 Sheets-Sheet 2

1,558,374

Inventor-
Irvin D. Lengel.
by his Attorneys.

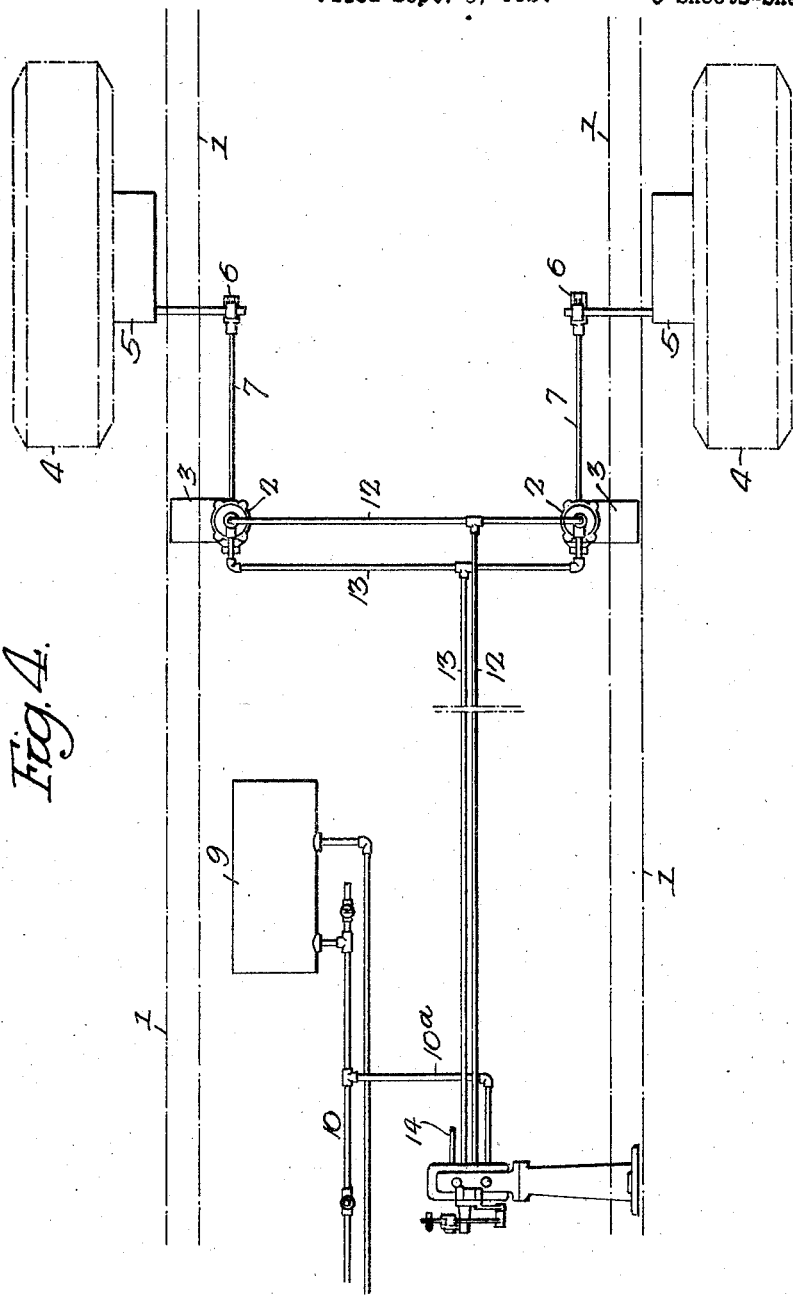

Patented Oct. 20, 1925.

1,558,374

UNITED STATES PATENT OFFICE.

IRVIN D. LENGEL, OF READING, PENNSYLVANIA, ASSIGNOR TO LENGEL COMPANY, OF WILMINGTON, DELAWARE, A CORPORATION OF DELAWARE.

AIR-BRAKE MECHANISM.

Application filed September 8, 1924. Serial No. 736,617.

*To all whom it may concern:*

Be it known that I, IRVIN D. LENGEL, a citizen of the United States, residing in Reading, Berks County, Pennsylvania, have invented certain Improvements in Air-Brake Mechanism, of which the following is a specification.

My invention relates to certain improvements in air pressure brakes for vehicles, especially automobile omnibuses and trucks.

The object of the invention is to improve the construction of the air brake mechanism so that the pressure will be applied progressively, thereby preventing the locking of the wheels and the sliding of the wheels on the pavement or roadway. This sliding action causes the surface of the tires to wear rapidly.

By my invention, a comparatively light pressure is applied, which allows the wheels to turn under friction, after which full pressure is applied, which stops the movement of the vehicle.

In the accompanying drawings:

Fig. 4 is a diagrammatic plan view, showing the arrangement of the brake cylinders and the control valve on the frame of an automobile.

Figure 1:
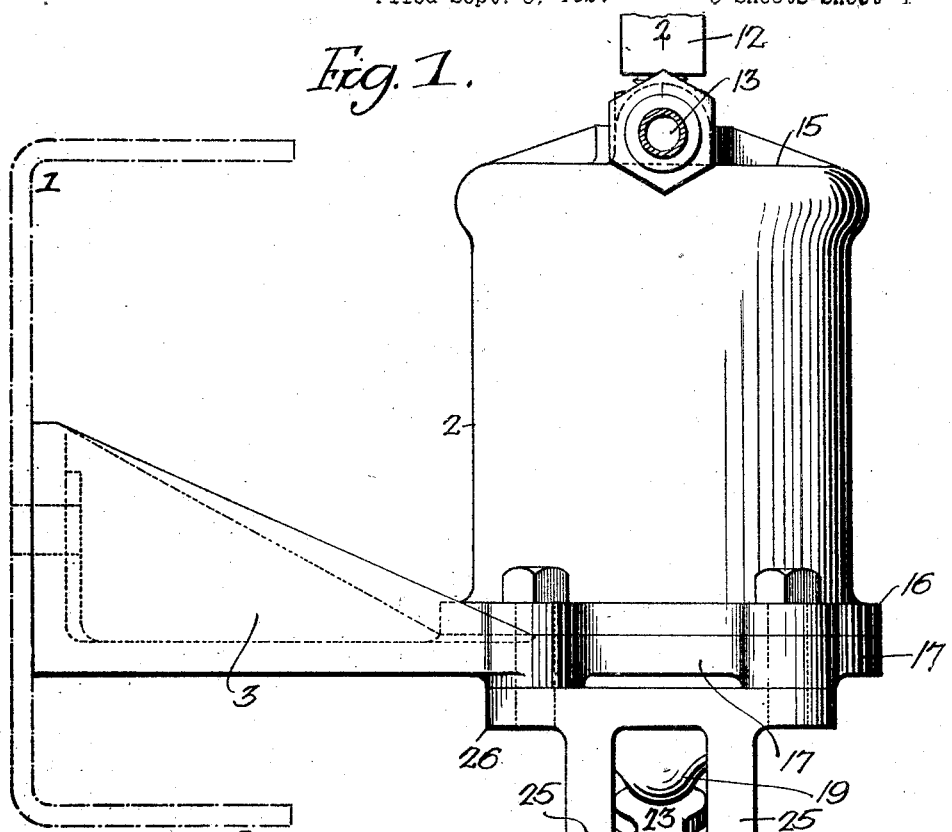
Fig. 1 is a side view of my improved air brake mechanism, showing it attached to the frame of an automobile omnibus.

The frame 1 of the vehicle is made of channel bars in the ordinary manner, as shown in Fig. 1. The brake cylinders 2 are secured to the channel bars by brackets 3. 4, 4 are the rear wheels of the vehicle. 5, 5 are the brakes, which are controlled through lever mechanism 6, connected by rods 7 to the levers 8 of the cylinder structure. An air pressure tank 9 is located at any suitable point and is connected by an air line 10 to an accumulator on the engine structure of the vehicle to which the brake mechanism is applied.

The control valve 11 is secured to the framework of the vehicle and is operated, preferably by the foot, to allow air under pressure to enter the cylinders through pipes 12 and 13. The air is supplied to the valve through a pipe $10^a$, which is connected to the air pipe 10. The air is exhausted from the valve through the pipe 14.

The diagram, Fig. 4, illustrates the location of the different parts hereinafter described. It will be understood that the arrangement may be modified without departing from the essential features of the invention.

Figure 2:
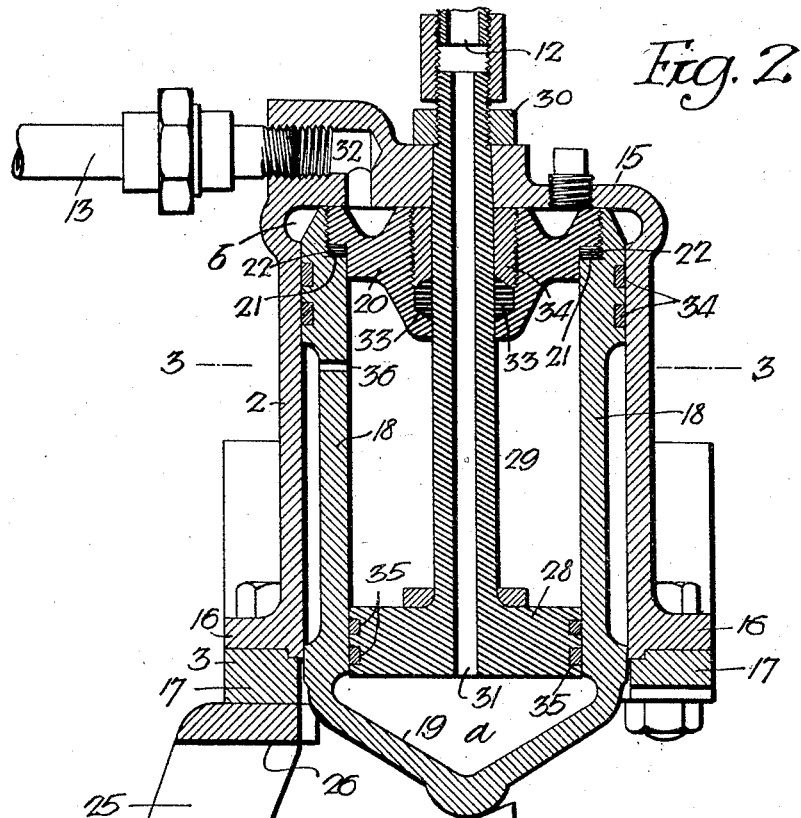
Fig. 2 is a sectional view on the line 2—2, Fig. 1.
Figure 3:
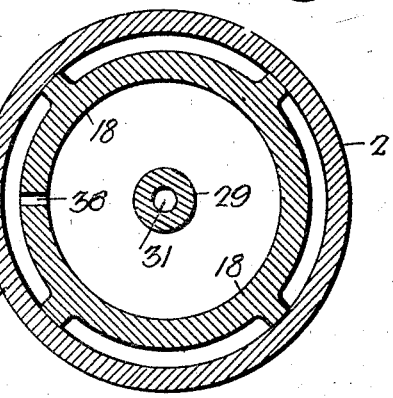
Fig. 3 is a sectional plan view on the line 3—3, Fig. 2.

Referring to Figs. 1 and 2, the cylinder 2 is open at the bottom and is closed at the top. The top 15 is formed, as shown in Fig. 2, and is preferably made integral with the cylinder. The cylinder has a base flange 16, which is secured to the base 17 that forms an integral part of the bracket 3, in the present instance. Mounted within the cylinder 2 is a cylindrical piston 18, which is closed at both ends. The lower end 19 is preferably an integral part of the cylindrical piston 18, while the upper end 20 is in the form of a plug having a threaded periphery, the threads of which engage threads on the cylindrical piston. Between a shoulder 21 on the cylindrical piston and the head is a packing ring 22 to make the joint air tight.

The end 19 of the cylindrical piston bears against the arm 23 of the bell-crank lever 8, which is mounted on a pivot pin 24, carried by brackets 25 that form an integral part of a plate 26, which is secured to the under side of the bracket 3. The arm 27 of the lever 8 is connected to the brake mechanism by rods 7, Fig. 4.

Within the cylindrical piston 18 is a fixed abutment 28, which is mounted on a stem 29 that is secured to the top 15 of the cylinder by a nut 30 that is mounted on the threaded portion of the stem. In the stem is a passage 31. The pipe 12 is coupled to this stem, and, when air, under pressure, is admitted to the pipe 12, it passes through the stem into the space $a$ between the fixed abutment and the bottom of the movable piston, projecting the movable piston and causing the lever mechanism primarily to apply the brakes. Communicating with the space $b$ between the head 20 of the cylindrical piston 18 and the cylinder 2 is a passage 32, which communicates with the pipe 13 that leads from the control valve so that, when air is admitted through the pipe 13 and the passage 32, pressure is applied on an increased area of the cylindrical piston, causing it to apply the brakes with sufficient pressure to stop the vehicle.

In the head 20 is a packing 33 that is held in place by a follower 34, which is screwed into the head, as shown in Fig. 2. The periphery of the cylindrical piston 18 has grooves in which are annular packing rings 34. In the periphery of the fixed abutment are grooves having annular packing rings 35. A vent 36 is provided for the space between the fixed abutment 28 and the head 20 to allow the cylindrical piston 18 to move forward easily.

Figure 5:
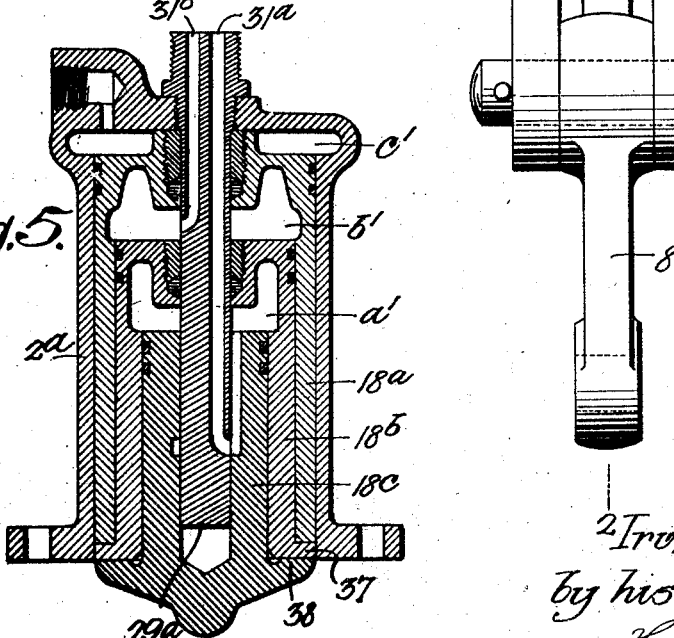
Fig. 5 is a view illustrating a modification of the invention.

In Fig. 5, a modification is illustrated, in which the cylinder 2ª is made substantially as shown in Fig. 2. Within this cylinder is a cylindrical piston 18ª that is open at the bottom and is closed at the top. Within the cylindrical piston 18ª is a second cylindrical piston 18ᵇ that has an external flange 37 against which the end of the piston 18ª comes in contact, when projected. Within the cylindrical piston 18ᵇ is a third cylindrical piston 18ᶜ. The piston 18ª has a flanged head 38. Within the cylinder 2 is a tubular stem 29ª that has passages 31ª and 31ᵇ, which communicate with the spaces a', b' and c'. Suitable packing is provided, as shown. The mechanism illustrated in Fig. 5 provides three pressures.

While the invention is shown as brake mechanism for automobiles, omnibuses and trucks, it will be understood that the invention can be applied to the brake mechanism of other vehicles, such as railway cars, &c., without departing from the spirit of the invention.

I claim—

1. The combination in brake mechanism, of a cylinder; an abutment extending into the cylinder; a hollow piston located between the abutment and the walls of the cylinder, said piston having a plurality of pressure surfaces; and means for successively applying fluid to said surfaces of the piston to project the piston and to apply the brakes.

2. The combination in brake mechanism, of a cylinder; a hollow piston having a closed end; an abutment secured to the cylinder and extending into the piston, said piston having two pressure surfaces; and means for successively applying fluid, under pressure, to the surfaces of the piston.

3. The combination in brake mechanism for vehicles, of a cylinder; a hollow piston in the cylinder having a closed end and extending beyond the end of the cylinder; a lever; a bracket to which the lever is pivoted, said piston bearing against one arm of the lever, the piston having two pressure surfaces; an abutment secured to the cylinder and extending into the piston; means for admitting fluid, under pressure, to the spaces between the abutment and the end of the piston; and means for admitting fluid, under pressure, between the end of the cylinder and the piston.

4. The combination in brake mechanism for vehicles, of a cylinder; an abutment in the cylinder; a piston located between the cylinder and the abutment; two ports for supplying fluid to project the piston; a valve controlling the admission of fluid to the cylinder; a lever actuated by the piston; and a brake connected to the lever.

5. The combination in air brake mechanism for motor driven vehicles, of two cylinders; a piston in each cylinder; means for applying two pressures to each of said pistons; brake mechanism at each side of the vehicle; a lever actuated by each of said pistons, each lever being connected to a brake mechanism; an accumulator at the motor; and a valve controlling the flow of air under pressure to the cylinders.

6. The combination in brake mechanism for vehicles, of a cylinder open at one end; an abutment located within the cylinder and having a stem secured to the closed end of the piston; a hollow piston within the cylinder, the abutment fitting the interior of the cylinder; a screw plug closing one end of the piston; packing between the plug and the stem of the abutment, said stem being hollow throughout its length for the passage of fluid; and a fluid passage communicating with the space between the end of the cylinder and the piston.

IRVIN D. LENGEL.